United States Patent
Sim et al.

(10) Patent No.: US 10,377,377 B2
(45) Date of Patent: Aug. 13, 2019

(54) ACTIVE LANE POSITIONING FOR BLIND ZONE MITIGATION

(71) Applicant: GM Global Technology Operations LLC, Detroit, MI (US)

(72) Inventors: Jay H. Sim, Bloomfield, MI (US); Chad T. Zagorski, Clarkston, MI (US); Constandi J. Shami, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 15/617,326

(22) Filed: Jun. 8, 2017

(65) Prior Publication Data
US 2018/0354508 A1    Dec. 13, 2018

(51) Int. Cl.
| | | |
|---|---|---|
| *B60W 30/09* | (2012.01) | |
| *B60W 30/16* | (2012.01) | |
| *B60W 50/14* | (2012.01) | |
| *B60W 50/16* | (2012.01) | |

(52) U.S. Cl.
CPC .......... *B60W 30/09* (2013.01); *B60W 30/16* (2013.01); *B60W 50/14* (2013.01); *B60W 50/16* (2013.01); *B60W 2050/143* (2013.01); *B60W 2050/146* (2013.01); *B60W 2550/30* (2013.01)

(58) Field of Classification Search
CPC .............................. B60W 30/09; B60W 30/16
See application file for complete search history.

(56) References Cited

U.S. PATENT DOCUMENTS

| | | | | |
|---|---|---|---|---|
| 6,438,491 | B1* | 8/2002 | Farmer | B60W 30/16 340/435 |
| 6,832,156 | B2* | 12/2004 | Farmer | B60W 30/16 340/435 |
| 8,589,014 | B2* | 11/2013 | Fairfield | G05D 1/024 701/28 |
| 9,493,118 | B1* | 11/2016 | Laur | B60Q 9/008 |
| 9,527,394 | B1* | 12/2016 | Tang | B60L 11/1818 |
| 2013/0151058 | A1* | 6/2013 | Zagorski | B60W 30/09 701/23 |
| 2015/0148985 | A1* | 5/2015 | Jo | G08G 1/096725 701/1 |
| 2016/0231746 | A1* | 8/2016 | Hazelton | G05D 1/0257 |
| 2016/0259334 | A1* | 9/2016 | Hashimoto | B60W 50/082 |
| 2016/0277997 | A1* | 9/2016 | Kang | H04W 40/22 |
| 2016/0375900 | A1* | 12/2016 | Laur | B60W 30/09 701/41 |
| 2017/0015354 | A1* | 1/2017 | Nilsson | G08G 1/167 |
| 2017/0297574 | A1* | 10/2017 | Trageser | B60W 30/16 |
| 2017/0369062 | A1* | 12/2017 | Saigusa | B60W 30/16 |
| 2018/0032082 | A1* | 2/2018 | Shalev-Shwartz | B60W 30/0953 |
| 2018/0037227 | A1* | 2/2018 | D'sa | B60W 50/04 |

(Continued)

*Primary Examiner* — Alex C Dunn

(57) ABSTRACT

A blind zone mitigation system of a host vehicle comprises i) at least one sensor that determines position information of a target vehicle with respect to the host vehicle, and ii) an active lane positioning module. The active lane positioning module receives the position information from the at least one sensor and determines a blind zone of the target vehicle. The active lane positioning module, in an active lane position mode, accelerates the host vehicle to move the host vehicle out of the blind zone of the target vehicle or decelerates the host vehicle to move the host vehicle out of the blind zone of the target vehicle.

16 Claims, 7 Drawing Sheets

(56) References Cited

U.S. PATENT DOCUMENTS

2018/0120859 A1* 5/2018 Eagelberg ............ G05D 1/0088
2018/0144623 A1* 5/2018 Shirakata ............. G08G 1/0141

* cited by examiner

ACTIVE LANE POSITIONING FOR BLIND ZONE MITIGATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to engine control systems, and more particularly to an active lane positioning system and methods.

Vehicle accidents may occur when a driver moves into another lane unaware that there is a second vehicle in the blind zone (or blind spot) of the first vehicle. For example, accidents may occur on highways near exits as vehicles enter or exit the highway and change lanes.

SUMMARY

A blind zone mitigation system of a host vehicle comprises i) at least one sensor that determines position information of a target vehicle with respect to the host vehicle, and ii) an active lane positioning module. The active lane positioning module receives the position information from the at least one sensor and determines a blind zone of the target vehicle. The active lane positioning module, in an active lane position mode, accelerates the host vehicle to move the host vehicle out of the blind zone of the target vehicle or decelerates the host vehicle to move the host vehicle out of the blind zone of the target vehicle.

In other features, the active lane positioning module, in a passive alert mode, generates a driver notification to alert the driver that the host vehicle is, or will be, in the blind zone. In other features, the active lane positioning module determines if the host vehicle will be in the blind zone for a time period greater than a threshold value and generates the driver notification in response to a determination that the host vehicle will be in the blind zone for a time period greater than the threshold value. In other features, the driver notification comprises at least one of an audible alarm, a visual alarm, or a haptic alarm.

In other features, the active lane positioning module determines if the host vehicle will be in the blind zone for a time period greater than a threshold value. The active lane positioning module, in response to a determination that the host vehicle will be in the blind zone for a time period greater than the threshold value, accelerates the host vehicle to reduce an amount of time the host vehicle will spend in the blind zone to less than the threshold value.

In other features, the active lane positioning module, in response to a determination that the host vehicle will be in the blind zone for a time period greater than the threshold value, decelerates the host vehicle to reduce an amount of time the host vehicle will spend in the blind zone to less than the threshold value. In other features, the active lane positioning module, in response to a determination that the host vehicle will be in the blind zone for a time period greater than the threshold value, decelerates the host vehicle to prevent the host vehicle from entering the blind zone.

In other features, the active lane positioning module communicates with a cruise control module of the host vehicle to cause the host vehicle to accelerate or decelerate. In other features, the active lane positioning module, in an active lane position mode, moves the host vehicle from higher risk zone in a first lane to a lower risk zone in a second lane.

A blind zone mitigation system of a host vehicle comprises: i) at least one sensor that determines position information of a plurality of target vehicles with respect to the host vehicle; and ii) and active lane positioning module. The active lane positioning module receives the position information from the at least one sensor and determines a blind zone of a first target vehicle. The active lane positioning module, in an active lane position mode, determines if decelerating the host vehicle will create a blind zone with a second target vehicle. In response to a determination that decelerating the host vehicle will not create a blind zone with the second target vehicle, the active lane positioning module decelerates the host vehicle to move the host vehicle out of the blind zone of the first target vehicle. In response to a determination that decelerating the host vehicle will create a blind zone with the second target vehicle, the active lane positioning module further determines if accelerating the host vehicle will create a blind zone with a third target vehicle. In response to a determination that accelerating the host vehicle will not create a blind zone with the third target vehicle, the active lane positioning module accelerates the host vehicle to move the host vehicle out of the blind zone of the first target vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Autonomous or semi-autonomous vehicles should not have blind zones. However, non-autonomous vehicles do have blind zones and will, at times, be in the vicinity of an autonomous or semi-autonomous vehicle. Avoidable collisions may occur when a first or host vehicle (HV) lingers in the blind zone of a second or target vehicle (TV). Therefore, autonomous or semi-autonomous vehicles that are proactive can prevent crashes before they occur.

The present disclosure describes an active lane positioning system and related methods that minimize the amount of time that a first vehicle lingers in the blind zone of a second vehicle (i.e., blind zone mitigation). The first or host vehicle (HV) seeks an open position in its current lane that is in front of or in the rear of the blind zone of the second or target vehicle (TV). The disclosed blind zone mitigation system positions the HV out of the TV blind zone by accelerating or decelerating. The blind zone mitigation system also maneuvers the HV to avoid letting a TV linger in the blind zone of the HV.

Figure 1:
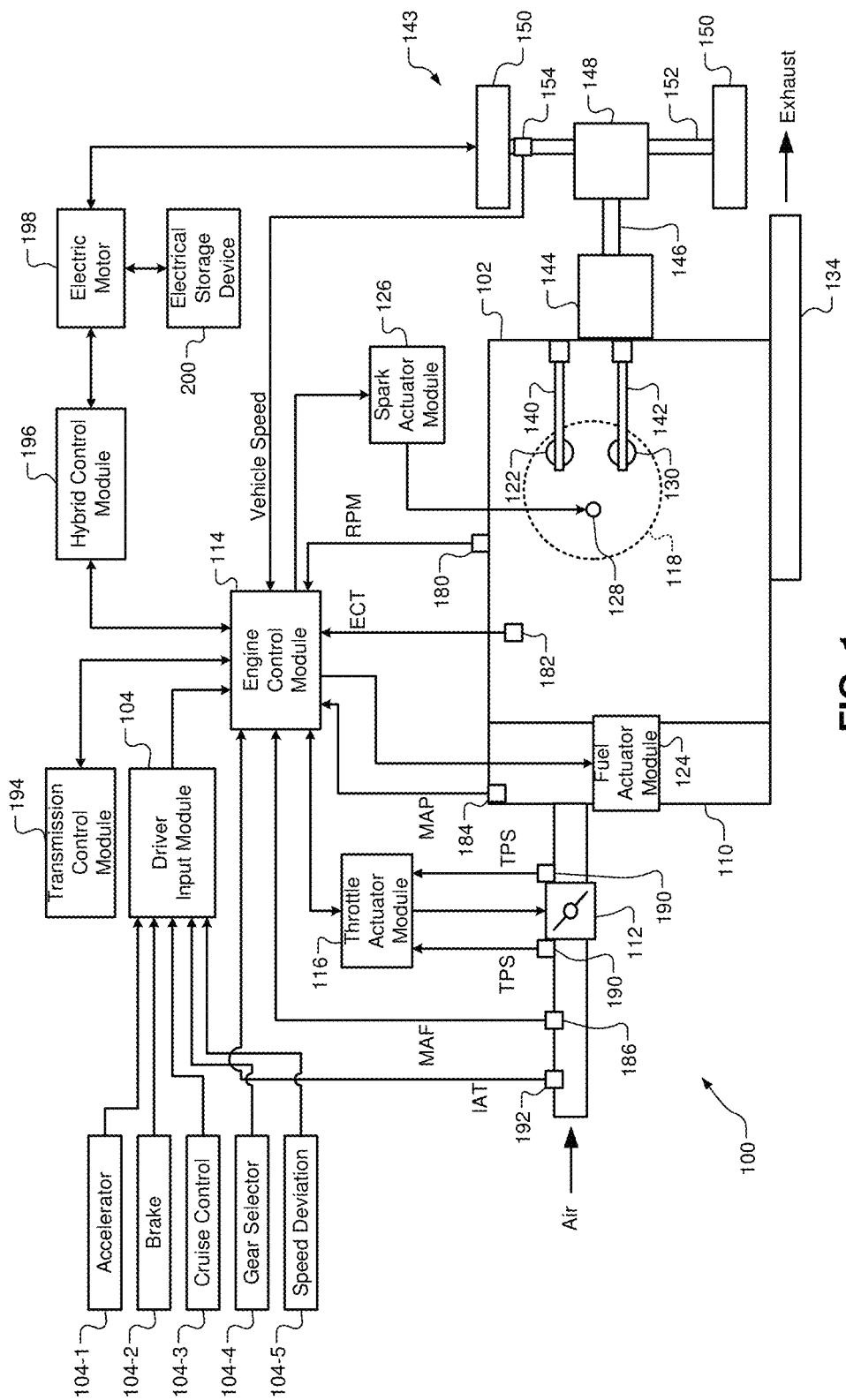
FIG. 1 is a functional block diagram of an exemplary engine system and an exemplary drive system according to the principles of the present disclosure.

FIG. 1 is a functional block diagram of an exemplary engine system and an exemplary drive system according to the principles of the present disclosure. Engine system 100 includes an engine 102 that combusts an air/fuel mixture to produce drive torque for a vehicle based on input from a driver input module 104. A driver may position an accelerator input device 104-1 and/or a brake input device 104-2 to control vehicle speed. The driver may position a cruise control input device 104-3 to an on or off position to control vehicle speed. The driver may position a gear selector input device 104-4 to a gear position such as a drive gear. The driver may position a speed deviation input device 104-5 to a speed deviation level to control a vehicle speed range.

The driver input module 104 may generate a driver input signal based on signals from the input devices. For example only, an accelerator position signal may be based on the position of the accelerator input device 104-1. A brake position signal may be based on the position of the brake input device 104-2. A cruise control signal may be based on the position of the cruise control input device 104-3. A gear signal may be based on the selected gear from the gear selector input device 104-4. A speed deviation signal may be based on the speed deviation level from the speed deviation input device 104-5.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The vehicle may further include a drive system 143. The drive system 143 may include an automatic transmission 144, a driveshaft 146, a differential 148, and/or a final drive 150. When the drive system 143 is coupled with the engine system 100, drive torque may be transferred to the final drive 150 to propel the vehicle. For example, the automatic transmission 144 may transfer drive torque from the engine system 100 to the final drive 150 through the driveshaft 146 and the differential 148. The final drive 150 may include a drive wheel. The differential 148 may transfer the torque to multiple drive wheels through an axle 152. A speed of the vehicle may be measured at the final drive 150 by a speed sensor 154.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100. The ECM 114 may generate an engine load signal based on the MAF signal, the throttle position signal, the IAT signal, and/or the MAP signal.

The ECM 114 may communicate with a transmission control module 194 to coordinate shifting gears in the automatic transmission 144. For example only, the ECM 114 may reduce engine torque during a gearshift. The ECM 114 may coordinate selection of gears in the automatic transmission 144 based on the gear selector input device 104-4. The ECM 114 may coordinate coupling of the automatic transmission 144 with the engine 102 such as through a clutch (not shown). The ECM 114 may coordinate coupling of the automatic transmission 144 with the engine 102 such as through a torque converter (not shown). When the engine 102 couples with the automatic transmission 144, drive torque may be transferred to the final drive 150. The ECM 114 may communicate with a hybrid control module 196 to coordinate operation of the engine 102, the drive system 143, and an electric motor 198.

The electric motor 198 may also produce drive torque for the vehicle. The electric motor 198 may couple with the drive system 143 to transfer drive torque to the final drive 150. For example only, the electric motor 198 may couple with the automatic transmission 144 to transfer drive torque to the final drive 150. The electric motor 198 may couple directly with the final drive 150 to transfer drive torque to the final drive 150. The electric motor 198 may couple with the engine 102 through a belt and pulley system (not shown).

The electric motor 198 may also function as a generator to produce electrical energy for use by vehicle electrical systems and/or for storage in an electrical storage device 200, such as a battery. For example only, the electric motor 198 may generate electrical energy when coupled with the drive system 143. As the vehicle moves, the drive system 143 may rotate the electric motor 198. The electric motor 198 may provide braking forces to the drive system 143 while generating electrical energy. In various implementations, various functions of the ECM 114, the transmission control module 194, and the hybrid control module 196 may be integrated into one or more modules.

Each system that varies an engine parameter may be referred to as an actuator that receives an actuator value. For example only, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112. Similarly, the spark actuator module 126 may be referred to as an actuator, while the corresponding actuator value may be the amount of spark advance relative to cylinder TDC. The ECM 114 may control actuator values in order to generate a desired torque from the engine 102.

The ECM 114 may selectively couple and decouple the engine system 100 with the drive system 143 when the gear selector input device 104-4 is in a drive gear of the drive system 143. The ECM 114 may selectively couple and decouple the engine system 100 from the drive system 143 based on input from the accelerator input 104-1 and the vehicle speed. For example only, when a driver releases the accelerator input 104-1 and the vehicle speed is greater than a speed threshold, the ECM 114 may decouple the engine system 100 from the drive system 143. When the driver controls the accelerator input 104-1 to achieve a target vehicle speed or the cruise control input 104-3 is set to the target vehicle speed, the ECM 114 may selectively couple and decouple the engine system 100 with the drive system 143 based on the vehicle speed and the target vehicle speed. The ECM 114 may selectively adjust torque produced by the engine system 100 based on the coupling of the drive system 143 with the engine system 100 and the vehicle speed.

Figure 2:
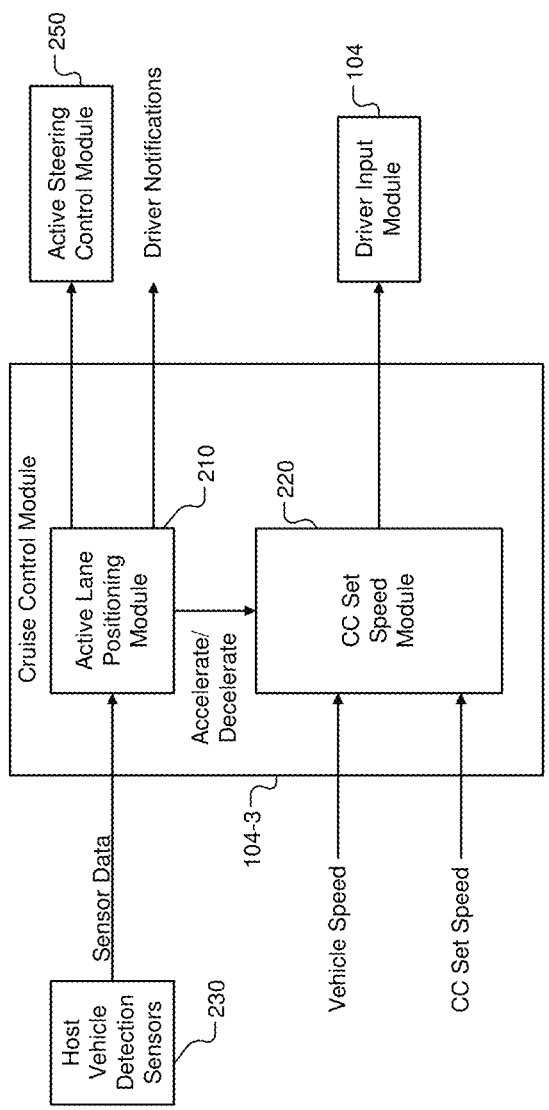
FIG. 2 is a functional block diagram of an exemplary cruise control module according to the principles of the present disclosure.

FIG. 2 is a functional block diagram of an exemplary cruise control module 104-3 according to the principles of the present disclosure. Cruise control module 104-3 comprises cruise control (CC) set speed module 220 and active lane positioning module 210. CC set speed module 220 is configured to perform the conventional functions of a cruise control system, including establishing (or "setting") the "set speed" (or "target speed") and then maintaining the set speed as the vehicle operates. The CC set speed module 202 may receive the driver input (i.e., CC set speed) and the vehicle speed. For example only, the vehicle speed may be set to the vehicle speed when the accelerator input is steady. The accelerator input may be steady when the accelerator position varies less than a predetermined amount over a predetermined time. The vehicle speed may be set to the vehicle speed when the cruise control input device is turned on.

In an exemplary operation, CC set speed module 220 receives as a first input the cruise control (CC) set speed in response to, for example, the driver activating the cruise control switch(es) on the steering wheel once the vehicle has reached the desired speed. CC set speed module 220 also receives as a second input the actual vehicle speed and compares the actual vehicle speed to the CC set speed. In response to the comparison, the CC set speed module 220 transmits to the driver input module 104 an output control signals that causes the vehicle to achieve the CC set sped by accelerating (if moving too slow), decelerating (if moving too fast), or maintaining current speed (if already moving at the CC set speed).

According to the principles of the present disclosure, the CC set speed module 220 also receives a third input from active lane positioning module 210 that causes CC set speed module 220 to accelerate or decelerate the vehicle in order to mitigate the amount of time spent in the blind spot of a target vehicle. The active lane positioning module 210 receives sensor data from one or more host vehicle detection sensors 230. The host vehicle (HV) detection sensors 230 may include virtually any type of sensor in the host vehicle that may be used to determine the direction and distance of a second (or target) vehicle and thereby determine the blind zone of the target vehicle. For example, the HV object detection sensors may comprise one or more cameras in the host vehicle, acoustic location devices, infrared sensors, radio detection and ranging (radar) sensors, and light imaging, detecting, and ranging (LiDAR) sensors, among others.

In an active lane positioning mode of operation, the active lane positioning module 210 uses the sensor data to determine whether the host vehicle is in or is approaching the blind zone of the target vehicle. As noted, the sensor data may include, for example, direction and distance data for the target vehicle. If the host vehicle is in or is approaching the blind zone of the target vehicle, active lane positioning module 210 may transmit an accelerate command to the CC set speed module 220 to move the host vehicle through the target vehicle blind zone more rapidly, thereby minimizing the time the HV spends in the TV blind zone. Alternatively, active lane positioning module 210 may transmit a decelerate command to the CC set speed module 220 to prevent the host vehicle from entering the target vehicle blind zone in the first place.

In a further embodiment of the active lane positioning mode, the active lane positioning module 210 uses the sensor data to provide both longitudinal and lateral lane positioning control. Longitudinal lane positioning control comprises accelerating or decelerating (as described above) in the same lane to move the host vehicle from an area of higher blind zone risk to an area of lower blind zone risk. Lateral lane positioning control comprises moving the host vehicle from one lane to a different lane to move the host vehicle from an area of higher blind zone risk to an area of lower blind zone risk. In lateral lane positioning control, the active lane position module 210 communicates with active steering control module 250 to move the host vehicle from a first land to a second lane.

In the further embodiment, the position of the host vehicle relative to the target vehicle has a defined "risk" parameter based on the blind zone risk, as illustrated and explained in greater detail below in FIG. 6. The active lane positioning module 210 will accelerate, decelerate, and/or change lanes to position the host vehicle in a zone or area of the road that minimizes risk with respect to the target vehicle. The time spent in a given zone is a factor for increasing risk. The position of the HV with respect to the TV is also a factor for increasing risk. According to the principles of the disclosure, the active lane positioning module 210 moves the host vehicle from higher risk zones to lower risk zones while maintaining limits for acceleration (or deceleration) and jerk limits for passenger comfort.

Additionally, in an active notification and/or warning mode of operation, active lane positioning module 210 may generate one or more driver notification(s) that alert and/or warn the driver that the host vehicle is in or is about to enter the blind zone of the target vehicle. The driver notifications may include, but are not limited to, visual, audible, and haptic alarms. For example, active lane positioning module 210 may sound a beeping alarm, illuminate a dashboard warning light, illuminate some other icon (e.g., on the windshield vertical pillars), or vibrate the steering wheel or the operator's seat. This enables the driver to avoid entering, or to move out of, the blind zone. In some embodiments, active lane positioning module 210 may accelerate or decelerate the host vehicle, as in active lane positioning mode, and also transmit driver notifications, as in active notification and/or warning mode.

Figure 3:
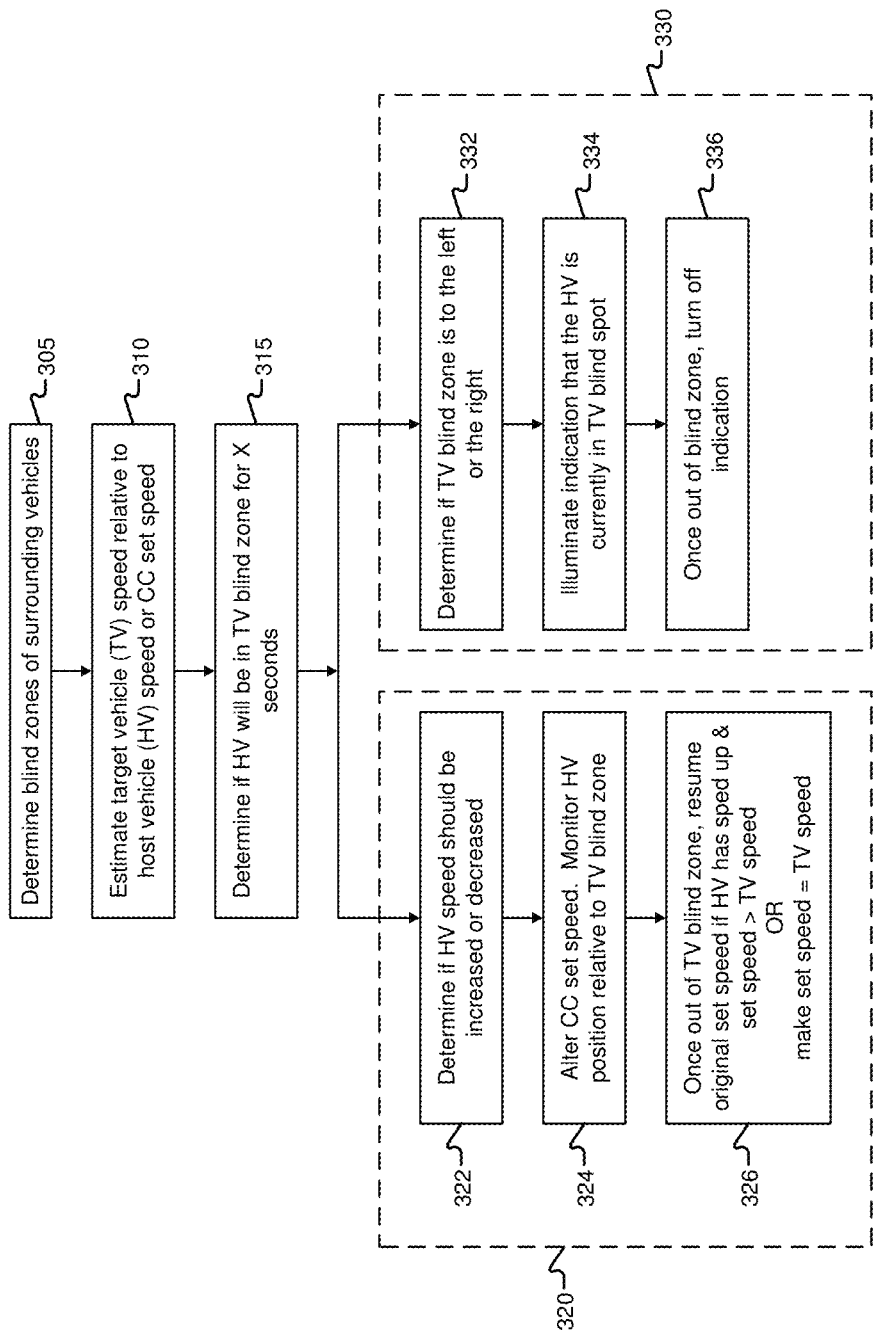
FIG. 3 is a high level flowchart depicting a method of active lane positioning for blind zone mitigation according to the principles of the present disclosure.

FIG. 3 is a high level flowchart depicting a method of active lane positioning for blind zone mitigation according to the principles of the present disclosure. In 305, active lane positioning module 210 determines from the sensor data the blind zones or one of more surrounding vehicles. In 310, active lane positioning module 210 estimates the target vehicle (TV) speed relative to the host vehicle (HV) speed or CC set speed. In 315, active lane positioning module 210 determines if the HV will be in TV blind zone for "X" seconds, where X is a threshold time value.

If the HV will be in the TV blind zone for greater than the threshold time value, X, active lane position module may enter active lane positioning mode 320. In 322, active lane positioning module 210 determines if the host vehicle speed should be increased or decreased. In 324, active lane positioning module 210 alters the CC set speed to cause the host vehicle to accelerate or decelerate. Active lane positioning module 210 continues to monitor the host vehicle position relative to the target vehicle blind zone. In 326, once the HV is out of the TV blind zone, the active lane positioning module 210 resumes the original set speed if the host vehicle has accelerated and the CC set speed is greater than the target vehicle speed. Alternatively, the active lane positioning module 210 will set the CC set speed to be equal to the target vehicle speed.

Alternatively, if the HV will be in the TV blind zone for greater than the threshold time value, X, active lane position module may enter passive alert mode 330. In 332, active lane positioning module 210 determines if the TV blind zone is to the left or the right of the host vehicle. In 334, active lane positioning module 210 may illuminate a notification, sound an alarm, and/or vibrate the steering wheel or operator's seat, to indicate that the HV is currently in the TV blind zone. The notification will identify the direction (left or right) of the TV blind spot to inform the driver of the TV blind spot location. In 336, once the driver has moved the host vehicle out of the TV blind zone, the active lane positioning module 210 turns off the illuminated notification, audio alarm, and/or vibration.

Figure 4:
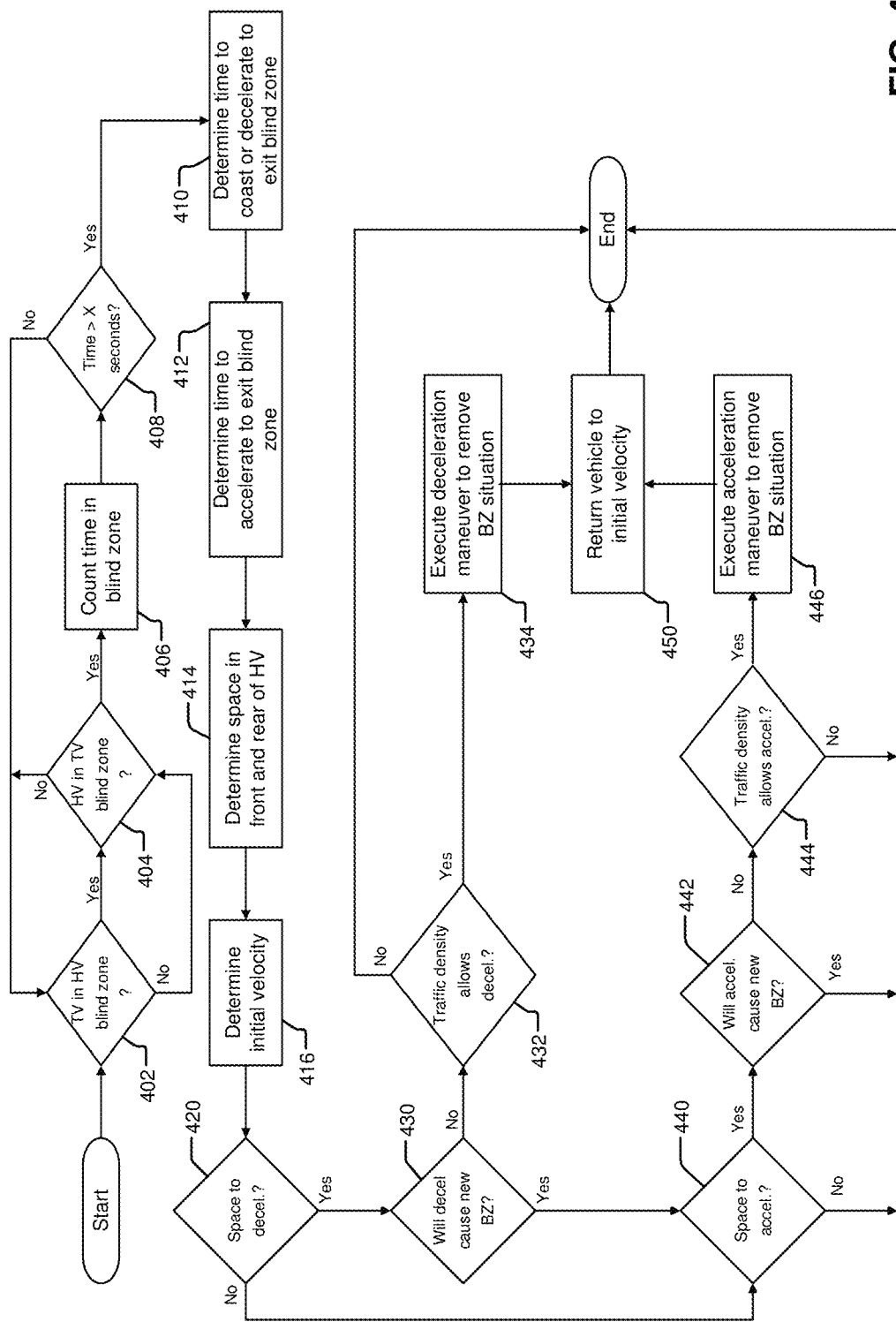
FIG. 4 is a detailed flowchart depicting a method of active lane positioning for blind zone mitigation according to the principles of the present disclosure.

FIG. 4 is a detailed flowchart depicting a method of active lane positioning for blind zone mitigation according to the principles of the present disclosure. In 402 and 404, active lane positioning module 210 determines if the target vehicle is in the host vehicle blind zone (402) or if the host vehicle is in the target vehicle blind zone (404). If yes in either case, in 406, the active lane positioning module 210 estimates (or counts) the time that the HV or TV has been or will be in the blind zone of the other vehicle. In 408, the active lane positioning module 210 determines if the time in the blind zone exceeds a threshold (X) value. If not, the active lane positioning module 210 continues to monitor whether the target vehicle is in the host vehicle blind zone (402) or if the host vehicle is in the target vehicle blind zone (404).

If the time in the blind zones does exceed the threshold value, in 410, the active lane positioning module 210 determines the time to decelerate (or coast) to exit the blind zone. Next, in 412, the active lane positioning module 210 determine time to accelerate to exit blind zone. In 410, the active lane positioning module 210 determines from sensor data the vehicle spacing in front of and to the rear of the host vehicle. In 416, the active lane positioning module 210 determines the initial velocities of the host vehicle and the target vehicle.

In 420, the active lane positioning module 210 determines whether there is available space to decelerate. If yes, then in 430, the active lane positioning module 210 determines whether decelerating will cause a new blind zone with another target (or second) vehicle. If no, then in 432, the active lane positioning module 210 determines if the traffic density allows safe deceleration. If yes, in 434, the active lane positioning module 210 executes a deceleration maneuver to remove the blind zone situation.

If there is no space to decelerate (no in 420) or if deceleration will cause a new blind zone (yes in 430), then in 440, the active lane positioning module 210 determines if there is space to accelerate. If yes, then in 442, the active lane positioning module 210 determines whether acceleration will cause a new blind zone with another (or third) vehicle. If no, then in 444, the active lane positioning module 210 determines if the traffic density allows safe acceleration. If yes, in 446, the active lane positioning module 210 executes an acceleration maneuver to remove the blind zone situation.

After execution of a deceleration maneuver (in 434) or an acceleration maneuver (in 446), in 450, the active lane positioning module 210 returns the host vehicle to its initial velocity.

In FIG. 2, active lane positioning module 210 is implemented in cruise control module 104-3. However, this is not a requirement. In an alternate embodiment, active lane positioning module 210 may be implemented externally to cruise control module 104-3, such as in a lane centering control module or another module of the host vehicle.

Figure 5:
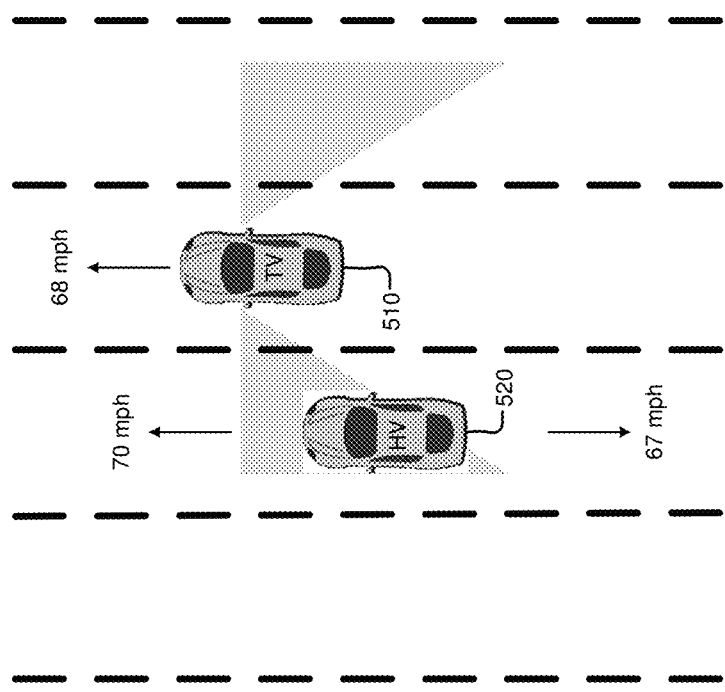
FIG. 5 depicts an active lane positioning operation to mitigate blind zone operation between two vehicles.

FIG. 5 depicts an active lane positioning operation to mitigate blind zone operation between two vehicles. In FIG. 5, a target vehicle (TV) 510 is moving at 68 miles per hour (mph) in a first lane. The blind zones on either side of target vehicle 510 are shown as gray-shaded triangles in FIG. 5. In the lane to the left of target vehicle 510, a host vehicle (HV) 520 is in, or is entering, the left-side blind zone of target vehicle 510. In order to minimize the time that host vehicle 520 spends in the left-side blind zone, active lane positioning module 210 may either accelerate host vehicle 520 to a speed greater than 68 mph or decelerate to a speed less than 68 mph. In FIG. 5, the host vehicle 520 accelerates to 70 mph or decelerates to 67 mph.

Figure 6:
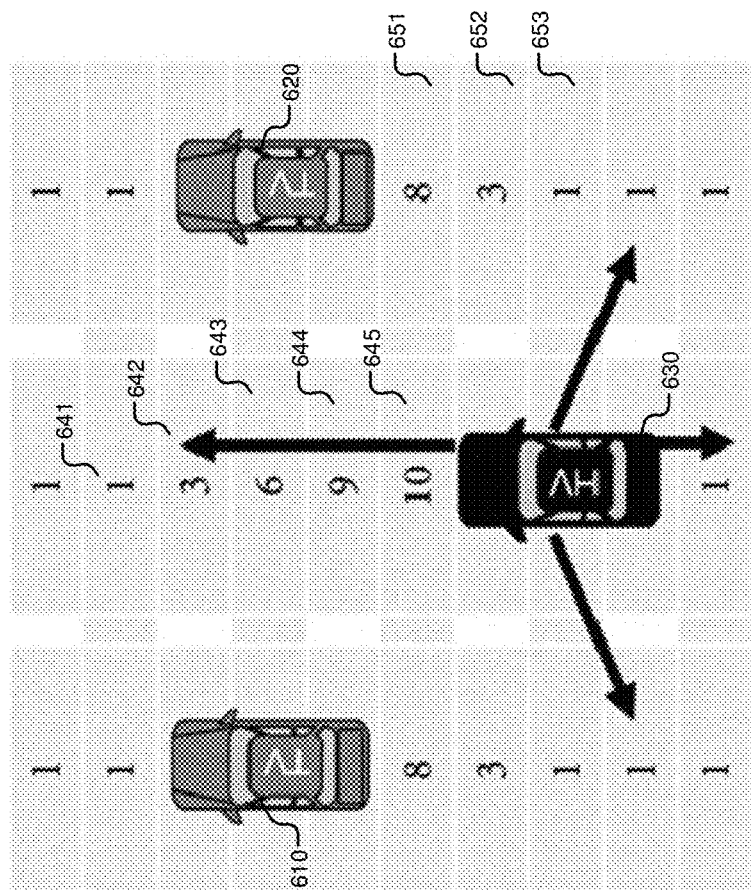
FIG. 6 depicts an active lane positioning operation to mitigate blind zone operation between two vehicles.

FIG. 6 depicts an active lane positioning operation to mitigate blind zone operation between two vehicles. In FIG. 6, target vehicle (TV) 610 is in the left lane, target vehicle (TV) 620 is in the right lane, and host vehicle (HV) 630 is in the center lane. According to an embodiment, the zones or areas of the three lanes are assessed a numerical risk value (e.g., scale from 1 to 10) by active lane positioning module 210, where a risk value of 1 is the lowest risk. In FIG. 6, the exemplary zones are depicted as shaded rectangles in each lane. The zones 641-645 in front of HV 630 have risk values that vary according to the position of each zone relative to the blind zones of TV 610 and TV 620 and the amount of time required for HV 630 to accelerate through the blind zones of TV 610 and TV 620. In FIG. 6, the blind zones of TV 610 and TV 620 include zones 642, 643, 644, and 645.

By way of example, zones 641, 642, 643, 644, and 645 have risk values of 1, 3, 6, 9, and 10, respectively. Zone 641 has a low risk value of 1 because, in zone 641, HV 630 would be in front of, and visible to, the drivers of TV 610 and TV 620 and therefore out of the blind zones of TV 610 and TV 620. However, zone 645 has a risk value of 10 because in zone 645, HV 630 would be deep in the blind zones of TV 610 and TV 620 and the amount of time to accelerate through the blind zones of TV 610 and TV 620 would be greatest. As a result, active lane positioning module 210 would use a relatively large amount of acceleration to move from zone 645 to zone 641 in order to minimize the time spent in the blind zones of TV 610 and TV 620. Alternatively, active lane positioning module 210 may decelerate HV 630 to move to a low risk zone behind HV 630 that is out of the blind zones.

However, active lane positioning module 210 may instead signal active steering control module 250 to cause HV 630 to change lanes in order to avoid the blind zones of TV 610 and TV 620. By way of example, HV 630 may move into the right lane behind TV 620 in order to move into a zone having lower risk. Exemplary zones 651, 652, and 653 behind TV 620 have risk values of 8, 3, and 1 respectively. Zones 651 and 652 have higher risk value because these zones are in the tailgating area behind TV 620. Therefore, active lane positioning module 210 and active steering control module 250 may move HV 630 into zone 653 (risk value=1) or a zone even further behind TV 620 in order to minimize the risk of being in the blind zones of TV 610 and TV 620.

Figure 7:
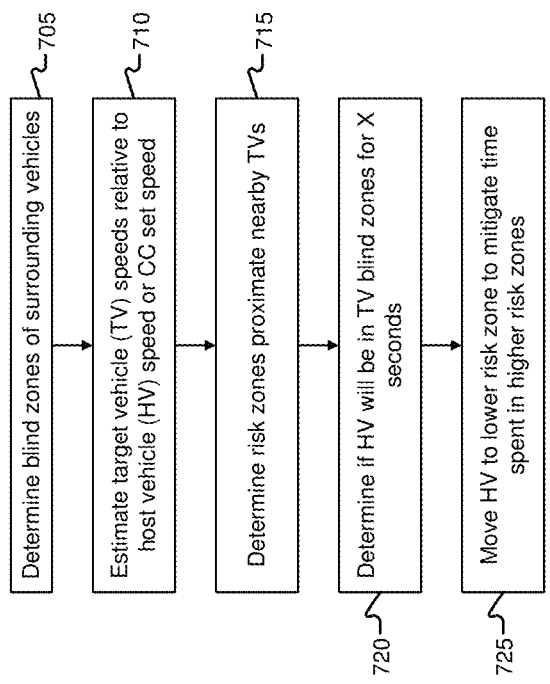
FIG. 7 is a detailed flowchart depicting a method of active lane positioning for blind zone mitigation according to the principles of the present disclosure.

FIG. 7 is a detailed flowchart depicting a method of active lane positioning for blind zone mitigation according to the principles of the present disclosure. In 705, active lane positioning module 210 determines the blind zones of surrounding vehicles using, for example, sensor data from host vehicle detection sensors 230. Active lane positioning module 210 also estimates in 710 the target vehicle (TV) speed(s) relative to the host vehicle (HV) speed or cruise control CC set speed.

Next, in 715, the active lane positioning module 210 uses the sensor data to determine the risk zones proximate the nearby TVs. In 720, active lane positioning module 210 determines if the HV will be in the TV blind zone(s) for a threshold time value (e.g., X seconds). If the HV will be in the TV blind zone(s) for greater than the threshold time value, active lane positioning module 210 and active steering control module 250 move the HV to a lower risk zone to mitigate time spent in higher risk zones.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The following description is merely exemplary in nature and is in no way intended to limit the disclosure, its application, or uses. For purposes of clarity, the same reference numbers will be used in the drawings to identify similar elements. As used herein, the phrase "at least one of A, B, and C" should be construed to mean a logical (A OR B OR C), using a non-exclusive logical OR, and should not be construed to mean "at least one of A, at least one of B, and at least one of C." It should be understood that steps within a method may be executed in different order without altering the principles of the present disclosure.

As used herein, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term "code", as used above, may include software, firmware, and/or microcode, and may refer to programs, routines, functions, classes, data structures, and/or objects. The term "shared processor circuit" encompasses a single processor circuit that executes some or all code from multiple modules. The term "group processor circuit" encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term "shared memory circuit" encompasses a single memory circuit that stores some or all code from multiple modules. The term "group memory circuit" encompasses a memory circuit that, in combination with additional memories, stores some or all code from one or more modules.

The term "memory circuit" is a subset of the term "computer-readable medium". The term "computer-readable medium", as used herein, does not encompass transitory electrical or electromagnetic signals propagating through a medium (such as on a carrier wave); the term "computer-readable medium" may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A blind zone mitigation system of a host vehicle, comprising:
    at least one sensor configured to determine position information of a target vehicle with respect to the host vehicle; and
    an active lane positioning module configured to receive the position information from the at least one sensor and to determine a blind zone of the target vehicle and to determine if the host vehicle will be in the blind zone for a time period greater than a threshold value, wherein the active lane positioning module, in response to a determination that the host vehicle will be in the blind zone for a time period greater than the threshold value, is further configured, in an active lane position mode, to one of:
    accelerate the host vehicle to reduce an amount of time the host vehicle will spend in the blind zone to less than the threshold value;
    decelerate the host vehicle to reduce an amount of time the host vehicle will spend in the blind zone to less than the threshold value; or
    decelerate the host vehicle to prevent the host vehicle from entering the blind zone.

2. The blind zone mitigation system of claim 1, wherein the active lane positioning module is further configured, in a passive alert mode, to generate a driver notification to alert the driver that the host vehicle is, or will be, in the blind zone.

3. The blind zone mitigation system of claim 2, wherein the active lane positioning module generates the driver notification in response to a determination that the host vehicle will be in the blind zone for a time period greater than the threshold value.

4. The blind zone mitigation system of claim 2, wherein the driver notification comprises at least one of: i) an audible alarm, ii) a visual alarm, and iii) a haptic alarm.

5. The blind zone mitigation system of claim 1, wherein the active lane positioning module is configured to communicate with a cruise control module of the host vehicle to cause the host vehicle to accelerate or decelerate.

6. The blind zone mitigation system of claim 5, wherein the active lane positioning module is further configured, in an active lane position mode, to move the host vehicle from higher risk zone in a first lane to a lower risk zone in a second lane.

7. A blind zone mitigation system of a host vehicle, comprising:
    at least one sensor configured to determine position information of a plurality of target vehicles with respect to the host vehicle; and
    an active lane positioning module configured to receive the position information from the at least one sensor and to determine a blind zone of a first target vehicle, wherein the active lane positioning module is further configured, in an active lane position mode, to determine if decelerating the host vehicle will create a blind zone with a second target vehicle and:

in response to a determination that decelerating the host vehicle will not create a blind zone with the second target vehicle, to decelerate the host vehicle to move the host vehicle out of the blind zone of the first target vehicle;

in response to a determination that decelerating the host vehicle will create a blind zone with the second target vehicle, to further determine if accelerating the host vehicle will create a blind zone with a third target vehicle and, in response to a determination that accelerating the host vehicle will not create a blind zone with the third target vehicle, accelerating the host vehicle to move the host vehicle out of the blind zone of the first target vehicle.

8. The blind zone mitigation system of claim 7, wherein the active lane positioning module is further configured, in a passive alert mode, to generate a driver notification to alert the driver that the host vehicle is, or will be, in the blind zone of the first target vehicle.

9. The blind zone mitigation system of claim 8, wherein the active lane positioning module is further configured to determine if the host vehicle will be in the blind zone of the first target vehicle for a time period greater than a threshold value, and to generate the driver notification in response to a determination that the host vehicle will be in the blind zone of the first target vehicle for a time period greater than the threshold value.

10. The blind zone mitigation system of claim 8, wherein the driver notification comprises at least one of: i) an audible alarm, ii) a visual alarm, and iii) a haptic alarm.

11. The blind zone mitigation system of claim 7, wherein the active lane positioning module is further configured to determine if the host vehicle will be in the blind zone of the first target vehicle for a time period greater than a threshold value.

12. The blind zone mitigation system of claim 11, wherein the active lane positioning module, in response to a determination that the host vehicle will be in the blind zone of the first target vehicle for a time period greater than the threshold value, accelerates the host vehicle to reduce an amount of time the host vehicle will spend in the blind zone of the first target vehicle to less than the threshold value.

13. The blind zone mitigation system of claim 11, wherein the active lane positioning module, in response to a determination that the host vehicle will be in the blind zone of the first target vehicle for a time period greater than the threshold value, decelerates the host vehicle to reduce an amount of time the host vehicle will spend in the blind zone of the first target vehicle to less than the threshold value.

14. The blind zone mitigation system of claim 11, wherein the active lane positioning module, in response to a determination that the host vehicle will be in the blind zone of the first target vehicle for a time period greater than the threshold value, decelerates the host vehicle to prevent the host vehicle from entering the blind zone of the first target vehicle.

15. The blind zone mitigation system of claim 7, wherein the active lane positioning module is configured to communicate with a cruise control module of the host vehicle to cause the host vehicle to accelerate or decelerate.

16. The blind zone mitigation system of claim 15, wherein the active lane positioning module is further configured, in an active lane position mode, to move the host vehicle from higher risk zone in a first lane to a lower risk zone in a second lane.

* * * * *